United States Patent Office
3,440,317
Patented Apr. 22, 1969

3,440,317
CELL COLORING PROCESS AND COMPOSITION
FOR CYTOLOGICAL EXAMINATION
Arfilio J. Martinez, Caracas, Venezuela, assignor of ten
percent to John E. Marshall, Jr., and twenty percent to
Donald L. Day, both of Caracas, Venezuela
No Drawing. Filed Nov. 9, 1964, Ser. No. 409,975
Int. Cl. G01m 33/16
U.S. Cl. 424—3    5 Claims

ABSTRACT OF THE DISCLOSURE

An improved process for preparing cellular material for detailed cytological microscopic examination is provided. A novel cell coloring composition is utilized in the process which consists essentially of suitable quantities of Fast Green FCF, Bismark Brown, Eosin Yellowish, Orange G, phosphotungstic acid, and lithium carbonate dissolved in a solvent comprising ethyl alcohol and water. Results are achieved which are in all respects comparable to those achieved by the use of the more complex and time consuming PAP technique which is widely practiced throughout the world.

---

The present invention concerns a cell coloring composition, and process employing the same which is capable of enabling the microscopic examination of the various component parts of cell structure. More particularly, the invention is directed to an improved coloring composition and a process of using the same which materially simplifies the techniques of diagnostic cytology announced by George N. Papanicalaou, M.D. in 1942, while producing a satisfactory differentiation of cell components.

Since the so-called PAP technique and coloring composition became generally known in 1942, it has become widely accepted and acclaimed both in the United States and throughout much of the world. The standard, PAP technique has been found particularly useful in the field of exfoliative cytology and has enabled the early diagnosis of malignant disease which is otherwise clinically silent. As life or growth continues in most organisms, such as man, it has long been recognized that a spontaneous exfoliation of older cells results from epithelial linings throughout the body. These exfoliated cells tend to accumulate in various parts of the body, and may be readily obtained therefrom by known techniques and prepared by coloring for a microscopic examination by specially trained members of the medical profession for the detection of cell abnormalities, such as cancer. In the past, this practice of diagnostic cytology has tended to be unusually time consuming, as much time has been required to prepare and screen slides. In some areas this task has become so great that lay screeners or specially trained cytotetchnologists are employed to help relieve this burden from the pathologist. Any proposals to simplify the standard PAP cell coloring technique must by necessity continue to give the required cell structure differentiation so that accurate visual analyses may be made.

The standard PAP technique as it is practiced in many laboratories is summarized below. According to the standard PAP coloring technique following the fixation of the cellular material to be studied upon a slide, it has been essential in order to produce cellular material suitable for accurate and detailed visual analysis that the specimen be successively treated with three different dye solutions (Harris Hematoxylin, Orange G, and E. A. 36) which contain a total of five dyes. Various minor time variations for practicing the steps of the PAP coloring technique are common. This relatively simple technique is nevertheless an exacting and time consuming process which has required strict adherence to its basic steps.

In order to prepare an acceptable slide, the cellular material must be affixed to the glass slide in such a manner that its existing structure is stabilized and caused to retain its usual configuration throughout the subsequent coloring steps and eventual microscopic examination. The fixation step is accomplished by placing a small quantity or smear of the cellular material to be examined upon the surface of a conventional slide and promptly immersing the slide in a suitable fixation solution. A common fixation solution for this purpose is formed from equal parts by volume of a 95 percent aqueous solution of ethyl alcohol, and of ether. In order to minimize the fire hazard, ether has been eliminated from the fixation solution by some pathologists with apparently equally effective results. Others have proposed 97.5 parts by volume of pure isopropyl alcohol together with 2.5 parts of glacial acetic acid as a suitable fixation solution. The time required to satisfactorily fix and stabilize a smear suitable for detailed examination is at least fifteen minutes, with particularly good results being obtained in twenty-four to forty-eight hours. Slides bearing cellular material may usually be kept in the fixation solution for up to fifteen days without harmful results.

Standard PAP technique

Following fixation, the steps of the Papanicolaou process are as follows:

(1) The slide is removed from the fixation solution without drying and hydrated by the successive immersion in a series of aqueous ethyl alcohol solutions of varying concentration, and finally placed in distilled water. The series of aqueous ethyl alcohol solutions employed prior to immersion in distilled water in the order of use is as follows: 80 percent, 70 percent, and 50 percent.

(2) The slide is placed in a coloring solution of Harris Hematoxylin for 5 to 10 minutes.

(3) Rinse gently with distilled water for 1 minute.

(4) Rinse by dipping in an aqueous solution of 0.5 percent hydrochloric acid for 5 seconds.

(5) Rinse gently with running tap water for 5 to 10 minutes.

(6) Rinse for 1 minute with a dilute solution of lithium carbonate formed by placing 3 drops of a saturated lithium carbonate solution in 100 cc. of water.

(7) Rinse thoroughly with tap water for 3 to 15 minutes.

(8) Dehydrate by passing successively through the following aqueous ethyl alcohol solutions: 50 percent, 70 percent, 80 percent, and 95 percent.

(9) Color with a solution of Orange G dye available from the National Aniline and Chemical Co. for 1 to 2 minutes. The dye solution is a 0.5 percent solution of the dye in 95 percent ethyl alcohol. To each 1000 cc. of the dye solution 0.15 gram of phosphotungstic acid is added.

(10) Remove excess dye by rinsing in at least two different solutions of 95 percent ethyl alcohol.

(11) Color for 2 minutes with E. A. 36 dye composition or a comparable trichromatic dye composition marketed under some other designation such as E. A. 50. 100 cc. of E. A. 36 trichromatic dye may comprise the following:

(a) Light Green SF Yellowish—0.5% solution in 95% ethyl alcohol _____cc__ 45
(b) Bismark Brown—0.5% solution in 95% ethyl alcohol _____cc__ 10
(c) Eosin Yellowish—0.5% solution in 95% ethyl alcohol _____cc__ 45
(d) Phosphotungstic acid _____gm__ 0.2
(e) Lithium carbonate saturated aqueous solution _____drop__ 1

(12) Rinse by dipping successively in three different solutions of 95 percent ethyl alcohol.
(13) Rinse in absolute ethyl alcohol.
(14) Rinse in xylol.
(15) Mount with Canada Balsam, gum damar or other neutral medium.

The total time commonly required following fixation for an experienced pathologist to prepare a slide suitable for detailed cytological examination by the standard PAP technique described above has been found to be about thirty-five minutes.

Objects of the invention

It is an object of the invention to provide a process for coloring cellular material in order to produce detailed differentiation between the various components of cell structure capable of enabling an accurate cytological microscopic examination.

It is an object of the invention to provide a process for coloring cellular material suitable of accurate and detailed microscopic examination in which the preparation of the material may be conducted rapidly and economically.

It is a further object of the invention to provide an improved coloring composition suitable for coloring cellular material prior to microscopic examination and capable of aiding in the production of the required differentiation between the various components of cell structure.

These and other objects, as well as the nature, and utilization of the invention will be readily apparent from the following detailed description.

Improved process and composition

It has been discovered that the standard coloring technique of Papanicalaou may be simplified and conducted in a significantly shorter time period by employing two dye solutions, one of which is a novel combination of four different dyes, as opposed to the three solutions required by Papanicalaou (Steps 2, 9 and 11 above). This use of the novel dyeing composition together with the process steps employed yields a worthwhile savings of time and energy to both cytologists and pathologists without sacrificing the quality of the cell component differentiation achieved.

Cellular material to be prepared for microscopic examination is first affixed to a slide according to any of the standard procedures known in the art, such as by immersion in an ethyl alcohol-ether solution for at least fifteen minutes. The remaining steps of the improved process are as follows:

(1) The slide is removed from the fixation solution without drying and directly hydrated by placing briefly in distilled water. A hydration period of about 10 to 15 seconds has been found to be particularly satisfactory. The distilled water, as well as each of the other solutions employed in the process may be at room temperature. The successive immersion of the slide in a series of aqueous ethyl alcohol solutions of varying concentration prior to immersion in distilled water is not required.

(2) The slide bearing the cellular material is colored by placing in a container of conventionally employed Harris Hematoxylin solution for a period about 2 to 3 minutes. The nucleus of the cell is primarily dyed by this dye solution.

(3) Rinse thoroughly with water to remove excess dye. A rinse period of about 10 to 15 seconds has been found to be particularly satisfactory. The slide may be simply held under a gentle stream of running tap water to accomplish the rinse.

(4) Rinse by dipping in an aqueous solution of about 0.5 percent of an acid, namely hydrochloric acid for about 5 seconds. 100 cc. of this dilute acid solution may be formed by adding ½ cc. of hydrochloric acid to 100 cc. of distilled water. The function of this acid treatment step is to further remove any excess Harris Hematoxylin which may be present on the cellular material.

(5) Rinse with water. A rinse period of about 15 to 30 seconds has been found to be particularly satisfactory. The slide may be simply dipped several times in a container of tap water.

(6) Rinse for about 10 seconds with a dilute solution of lithium carbonate formed by placing about 3 drops of saturated lithium carbonate solution in 100 cc. of water. The function of this rinse is to neutralize any acid remaining on the cellular material.

(7) Rinse with water to remove any remaining lithium carbonate solution. The rinse may be accomplished by dipping the slide for about 15 to 30 seconds in a container of tap water.

(8) Dehydrate by placing the slide successively in a series of aqueous alcohol solutions preferably of the following concentrations: about 50 percent, about 80 percent, and about 90 percent. Isopropyl alcohol is the preferred alcohol, however, alcohols such as methyl alcohol and ethyl alcohol may also be employed.

(9) Color with improved tetrachromatic dyeing composition such as by placing the slide in a container containing the composition for about two minutes. The dyeing composition comprises as a solvent about 900 parts by volume ethyl alcohol, and about 100 parts by volume distilled water and has dissolved in each liter of solvent about 0.3 to 0.6 gram, preferably about 0.4 gram, Fast Green FCF (F. D. and C. Green No. 3); about 0.2 to 0.4 gram, preferably about 0.25 gram, Bismark Brown; about 2 to 3 grams, preferably about 2.25 grams, Eosin Yellowish; about 1 to 2 grams, preferably about 1.125 grams, Orange G; about 3 to 5 grams, preferably about 4.0 grams, phosphotungstic acid; and about .005 to .02 gram, preferably about .01 gram, lithium carbonate. The portions of the cell other than the nucleus are dyed various pleasing and readily differentiated tones by this composition.

(10) Rinse with an essentially dehydrated alcohol such as by successively dipping the slide in two different beakers containing the rinse solution. Absolute ethyl alcohol or essentially dehydrated isopropyl alcohol are preferred rinse solutions. A rinse time of about 15 seconds has been found to be satisfactory.

(11) Rinse with a solution containing about 50 percent by volume xylol for about 15 seconds such as by dipping. The xylol containing solution may satisfactorily be formed from an equal part by volume of xylol together with an equal part by volume of either absolute ethyl alcohol, or essentially dehydrated isopropyl alcohol. If desired, however, the rinse employing a solution containing about 50 percent by volume xylol may be omitted and a rinse solution consisting of pure benzene substituted therefor.

(12) Rinse with essentially pure xylol or essentially pure benzene. This rinse may satisfactorily be completed within about 10 to 15 seconds. When benzene is selected for the rinse solution in step No. 11, rinsing therewith may be continued for an additional rinse period and thus avoid the necessity of rinsing with xylol as set forth in this step.

(13) Mount with Canada balsam, gum damar or other neutral medium.

The entire coloring process following fixation using the present improved tetrachromatic dyeing composition may be conducted in as few as six minutes which results in a considerable time advantage when compared to the standard PAP process discussed earlier. The colored cellular product resulting from the present process is nevertheless in all respects comparable to the standard PAP product from a quality standpoint with ample differentiation of cell structure for detailed analysis.

The improved tetrachromatic dyeing composition may be simply formed. For example, one liter of the composition may be formed by first placing 1.125 grams of the Orange G dye component in a mortar and grinding it well, dissolving it in 20 ml. of distilled water and 280 ml. of 98 percent by volume ethyl alcohol. 0.4 gram of Fast Green FCF, 0.25 gram Bismark Brown, and 2.25 grams Eosin Yellowish may likewise be placed in a mortar, ground, combined by the addition of 60 ml. distilled water, and then completely dissolved in 420 ml. of 98 percent ethyl alcohol. The Orange G dye solution may be added to the solution of the other three dyes. Four grams of phosphotungstic acid may be dissolved in 220 ml. of 98 percent ethyl alcohol and added to the dye solution. 0.75 ml. or 15 drops of saturated lithium carbonate solution may be added, and the resulting solution filtered. The improved tetrachromatic dyeing composition solution is preferably stored in an amber or other similar container.

The present invention may be used to color a variety of cellular materials in addition to exfoliated cells from the epithelial linings of man or other higher animals. Cells may be obtained by known methods from organs and organisms which do not spontaneously yield exfoliated cells and colored according to the invention. The cells thus prepared are suitable for the detection of cell abnormalities such as cancer or other cytological investigations, such as studies to determine the morphological and functional state of the female reproductive organs. Chromosome studies may be made. Bacteria and protozoa may be stained or colored for microscopic study.

Aside from the considerable savings of time which may be realized by employing the present invention several other important advantages may be attributed to it. The E. A. 36 dye employed in the standard PAP technique tends to lose its effectiveness after about 120 dyeings, while the dyeing composition of the invention may be used for up to 500 dyeings without impaired results. The Fast Green FCF component of the composition is more resistant to light than the Light Green SF Yellowish employed in the PAP technique. The ability to use isopropyl alcohol in the rinse steps of the process as opposed to generally more expensive ethyl alcohol results in an economic advantage to the user. The results of the dyeing are of good quality having shades of classic cell colorations without the appearance of cytological distortions.

I claim:

1. A process for preparing cellular material suitable for detailed cytological microscopic examination comprising fixing the cellular material upon a slide, hydrating, coloring with Harris Hematoxylin, rinsing, dehydrating, coloring with a dyeing composition comprising as a solvent about 900 parts by volume ethyl alcohol, and about 100 parts by volume water; and having dissolved in each liter of said solvent components consisting essentially of about 0.3 to 0.6 gram Fast Green FCF, about 0.2 to 0.4 gram Bismark Brown, about 2 to 3 grams Eosin Yellowish, about 1 to 2 grams Orange G, about 3 to 5 grams phosphotungstic acid, and about .005 to .02 gram lithium carbonate; rinsing, and mounting.

2. A process for preparing cellular material suitable for detailed cytological microscopic examination comprising fixing the cellular material upon a slide, hydrating, coloring with a solution of Harris Hematoxylin for about 2 to 3 minutes, rinsing in water, rinsing in a solution of about 0.5 percent by volume aqueous hydrochloric acid, rinsing in water, rinsing in a dilute solution of lithium carbonate, rinsing in water, dehydrating by placing successively in a series of about 50 percent, about 80 percent, and about 90 percent by volume aqueous alcohol solutions selected from the group consisting of methyl alcohol, ethyl alcohol, and isopropyl alcohol; coloring for about 2 minutes with a dyeing composition comprising as a solvent about 900 parts by volume ethyl alcohol, and about 100 parts volume water; and having dissolved in each liter of said solvent components consisting essentially of about 0.4 gram Fast Green FCF, about .25 gram Bismark Brown, about 2.25 grams Eosin Yellowish, about 1.125 grams Orange G, about 4.0 grams phosphotungstic acid, and about .01 gram lithium carbonate; rinsing in an essentially dehydrated alcohol selected from the group consisting of ethyl alcohol and isopropyl alcohol; rinsing in a solution selected from the group consisting of about equal parts by volume xylol and absolute ethyl alcohol, about equal parts by volume xylol and essentially dehydrated isopropyl alcohol, and essentially pure benzene; rinsing in a solution selected from the group consisting of essentially pure xylol, and essentially pure benzene; and mounting.

3. A dyeing composition for coloring cellular material for cytological microscopic examination comprising as a solvent about 900 parts by volume ethyl alcohol, and about 100 parts by volume water; and having dissolved in each liter of said solvent components consisting essentially of about 0.3 to 0.6 gram Fast Green FCF, about 0.2 to 0.4 gram Bismark Brown, about 2 to 3 grams Eosin Yellowish, about 1 to 2 grams Orange G, about 3 to 5 grams of phosphotungstic acid, and about .005 to .02 gram lithium carbonate.

4. A dyeing composition for coloring cellular material for cytological microscopic examination comprising as a solvent about 900 parts by volume ethyl alcohol, and about 100 parts by volume water; and having dissolved in each liter of said solvent components consisting essen tially of about 0.4 gram Fast Green FCF, about 0.25 gram Bismark Brown, about 2.25 grams Eosin Yellowish, about 1.125 grams Orange G, about 4.0 grams phosphotungstic acid, and about .01 gram lithium carbonate.

5. A process for preparing cellular material suitable for detailed cytological microscopic examination comprising fixing the cellular material upon a slide, hydrating, coloring with a solution of Harris Hematoxylin for about 2 to 3 minutes, rinsing in water, rinsing in a solution of about 0.5 percent by volume aqueous hydrochloric acid, rinsing in water, rinsing in a dilute solution of lithium carbonate, rinsing in water, dehydrating by placing successively in a series of about 50 percent, about 80 percent, and about 90 percent by volume aqueous alcohol solutions selected from the group consisting of methyl alcohol, ethyl alcohol, and isopropyl alcohol; coloring for about 2 minutes with a dyeing composition comprising as a solvent about 900 parts by volume ethyl alcohol, and about 100 parts volume water; and having dissolved in each liter of said solvent components consisting essentially of about 0.3 to 0.6 gram Fast Green FCF, about 0.2 to 0.4 gram Bismark Brown, about 2 to 3 grams Eosin Yellowish, about 1 to 2 grams Orange G, about 3 to 5 grams phosphotungstic acid, and about .005 to .02 gram lithium carbonate; rinsing in an essentially dehydrated alcohol selected from the group consisting of ethyl alcohol and isopropyl alcohol; rinsing in a solution selected from the group consisting of about equal parts by volume xylol and absolute ethyl alcohol, about equal parts by volume xylol and essentially dehydrated isopropyl alcohol, and essentially pure benzene; rinsing in a solution selected from the group consisting of essentially pure xylol, and essentially pure benzene; and mounting.

References Cited

Koss: Diagnostic Cytology, J. B. Lippincott, Phila., 1961, pp. 324, 325, 327, 328, 329.

Bray: Clinical Lab. Methods, C. V. Mosby Co., St. Louis, 6th ed., 1962, pp. 544–546.

Cowdry: Lab. Technique, Williams & Wilkins, 1948, p. 137.

Chem. Abs., vol. 58, 1963, p. 3680.

A manual of Cytology, Nat. Comm. for Careers in Med. Tech. (1962), 2nd ed., 1963, pp. 11–4, 11–12.

Conn: Staining Procedures, Bio. Stain Comm., William & Wilkins, Baltimore, 2nd ed., 1960, pp. 34, 72.

ALBERT T. MEYERS, *Primary Examiner.*

A. FAGELSON, *Assistant Examiner.*

U.S. Cl. X.R.

8—25, 94.1; 424—7